(12) United States Patent
Reis

(10) Patent No.: US 7,044,653 B2
(45) Date of Patent: May 16, 2006

(54) MICROASSEMBLY AND METHOD FOR USING SAME

(75) Inventor: Eugene E. Reis, San Jose, CA (US)

(73) Assignee: Coherent, Inc., Santa Clara, CA (US)

(*) Notice: Subject to any disclaimer, the term of this patent is extended or adjusted under 35 U.S.C. 154(b) by 0 days.

(21) Appl. No.: 10/237,476

(22) Filed: Sep. 6, 2002

(65) Prior Publication Data

US 2003/0063870 A1 Apr. 3, 2003

Related U.S. Application Data

(60) Provisional application No. 60/318,069, filed on Sep. 7, 2001.

(51) Int. Cl.
*G02B 6/36* (2006.01)

(52) U.S. Cl. .................. 385/88; 248/466; 359/811

(58) Field of Classification Search .................. 385/88; 248/466, 176.3, 177.1, 178.1; 348/466, 176.3, 348/177.1, 178.1; 359/811, 819, 829
See application file for complete search history.

(56) References Cited

U.S. PATENT DOCUMENTS

| 2,753,586 | A | * | 7/1956 | Metz .......................... 16/18 R |
| 4,409,738 | A | * | 10/1983 | Renander et al. ............. 33/281 |
| 4,498,737 | A | | 2/1985 | Doggett |
| 4,749,250 | A | | 6/1988 | Carter |
| 4,752,109 | A | | 6/1988 | Gordon et al. |
| 4,842,391 | A | | 6/1989 | Kim et al. |
| 5,833,202 | A | * | 11/1998 | Wolfgang ................... 248/466 |
| 6,416,937 | B1 | | 7/2002 | Flanders et al. |

* cited by examiner

*Primary Examiner*—Daniel Stcyr
*Assistant Examiner*—Daniel A. Hess
(74) *Attorney, Agent, or Firm*—Dorsey & Whitney LLP

(57) ABSTRACT

The present invention provides a microassembly comprising a support structure, a body having a rounded portion in close proximity to the support structure and a microelement carried by the body. A fastener is provided to secure the rounded portion of the body to the support structure. The rounded portion of the body is translatable relative to the support structure and rotatable relative to the support structure about an axis before being secured to the support structure for permitting the microelement to be desirably positioned relative to the support structure.

26 Claims, 4 Drawing Sheets

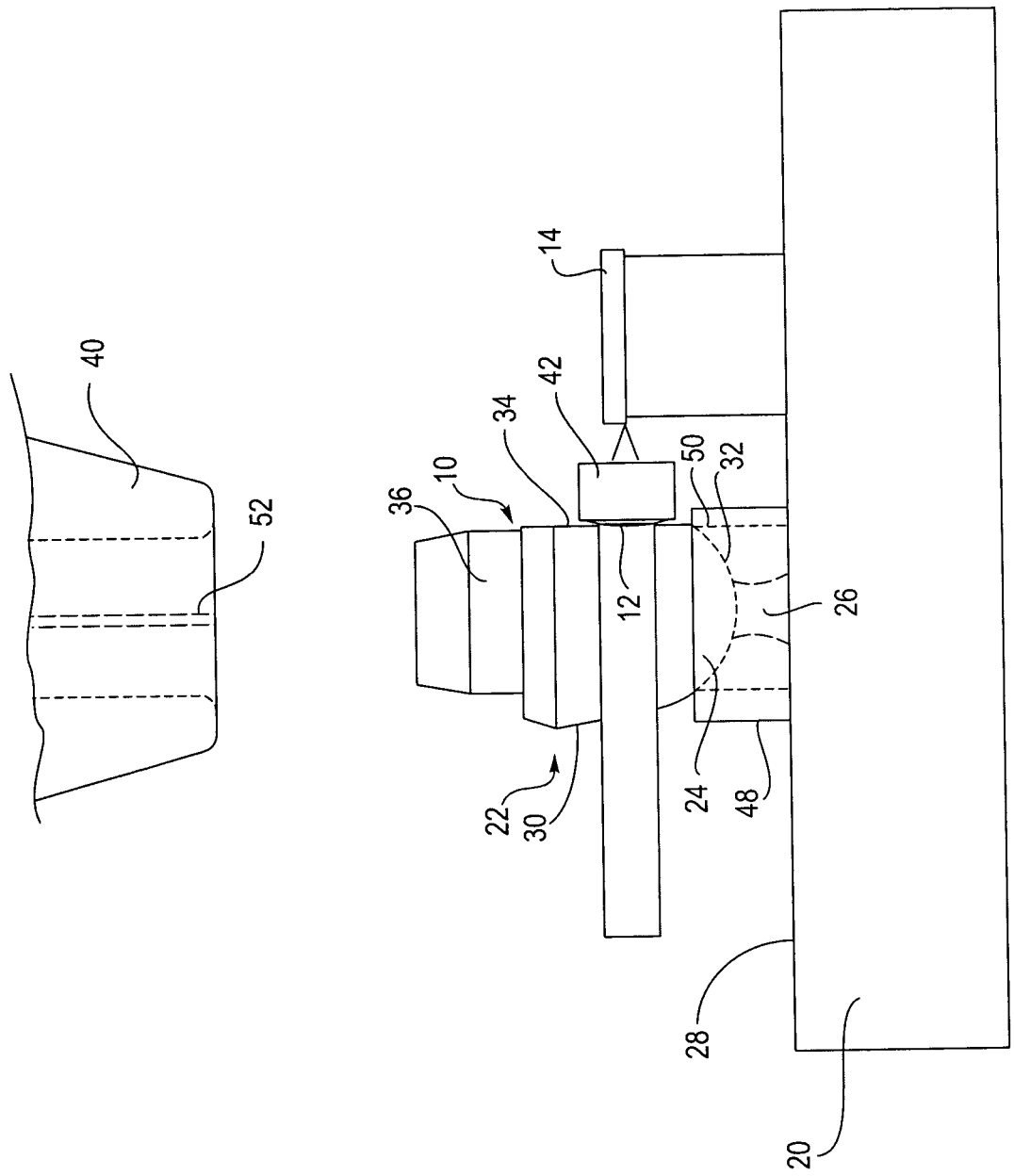

MICROASSEMBLY AND METHOD FOR USING SAME

CROSS-REFERENCE TO RELATED APPLICATION

This application claims priority to U.S. provisional patent application Ser. No. 60/318,069 filed Sep. 7, 2001, the entire content of which is incorporated herein by this reference.

FIELD OF THE INVENTION

The present invention relates generally to microassemblies and more particularly to microassemblies having positionable microelements.

BACKGROUND

Devices have been disclosed for mounting and aligning optical elements such as lenses for coupling light from laser diodes to optical fibers in an optical system. Prior art devices for mounting and aligning optical elements typically lack contact between the parts and supporting structure, thus necessitating the use of a filler material to bridge the gap between the optical element and the substrate, as well as some form of the adhesive to attach the filler to the optic and the substrate. In many cases, the same material performs the filler and adhesive functions. For example, in one prior art device, the lens is bonded to the substrate using an ultraviolet-curing epoxy. Once the lens is moved into position, a droplet of the liquid adhesive is added to fill the gap between the lens and the substrate, giving a filler with a shape determined largely by surface tension effects. The adhesive is cured with UV irradiation to create a solid filler that is attached to both surfaces. Typically these adhesive layer has a thickness ranging from 20 to 50 microns. Longer-term stability is generally limited by the dimensional instabilities, especially in the presence of residual stresses, temperature cycling or humidity. Designs based on this technique are well known for their tendency to creep over time.

Prior art mounting devices are described, for example, in U.S. Pat. No. 4,749,250 to Carter, U.S. Pat. No. 4,842,391 to Kim et al., U.S. Pat. No. 4,498,737 to Doggett, and U.S. Pat. No. 4,752,109 to Gordon et al. These prior art techniques use relatively bulky macro-sized elements which are not compatible with miniature assemblies. U.S. Pat. No. 6,416,937 to Flanders et al. describes a miniature holder where flexural elements are permanently deformed by an external alignment mechanism to provide multi-axis alignment. This technique requires expensive fabrication equipment and techniques for fabricating the holder and complicated iterative techniques for deforming the flexural elements.

In general, it is an object of the invention to provide a microassembly and method for positioning microelements.

SUMMARY OF THE INVENTION

The present invention provides a microassembly comprising a support structure, a body having a rounded portion in close proximity to the support structure and a microelement carried by the body. A fastener is employed to secure the rounded portion of the body to the support structure. The rounded portion of the body is translatable relative to the support structure and rotatable relative to the support structure about an axis before being secured to the support structure for permitting the microelement to be desirably positioned relative to the support structure.

The present invention further provides a method for positioning a microelement. The microelement is carried at an extremity of an elongate member attached to a body having a rounded portion. The body is rotatable about first, second and third orthogonal axes relative to a support structure. The method comprises the steps of translating the body relative to the support structure along the first axis to translate the microelement along the first axis, translating the body relative to the support structure along the second axis to translate the microelement along the second axis, rotating the body about the first axis and translating the body along the second axis relative to the support structure to translate the microelement along the third axis and securing the body to the support structure to fix the microelement relative to the support structure.

BRIEF DESCRIPTION OF THE DRAWINGS

The accompanying drawings, which are somewhat schematic in some instances, are incorporated in and form a part of this specification. These drawings illustrate several embodiments of the invention and, together with the description, serve to explain the principles of the invention.

FIG. 4 is a side elevational view of the microassembly device of FIG. 3 taken along 4—4 of FIG. 3.

DESCRIPTION OF THE INVENTION

The microassembly of the present invention is suitable for use, for example, in positioning a microelement, such as a microelement in an optical system. For example, as shown in FIGS. 1 to 4, the microassembly 10 can be used to mount and align a microelement 12 for providing a collimated optical beam 16 from a semiconductor laser or amplifier 14. In this regard, such a microassembly can be part of a tunable laser of the type disclosed in U.S. patent application Ser. No. 09/728,212, filed Nov. 29, 2000, the entire content of which is incorporated by this reference.

Figure 1:
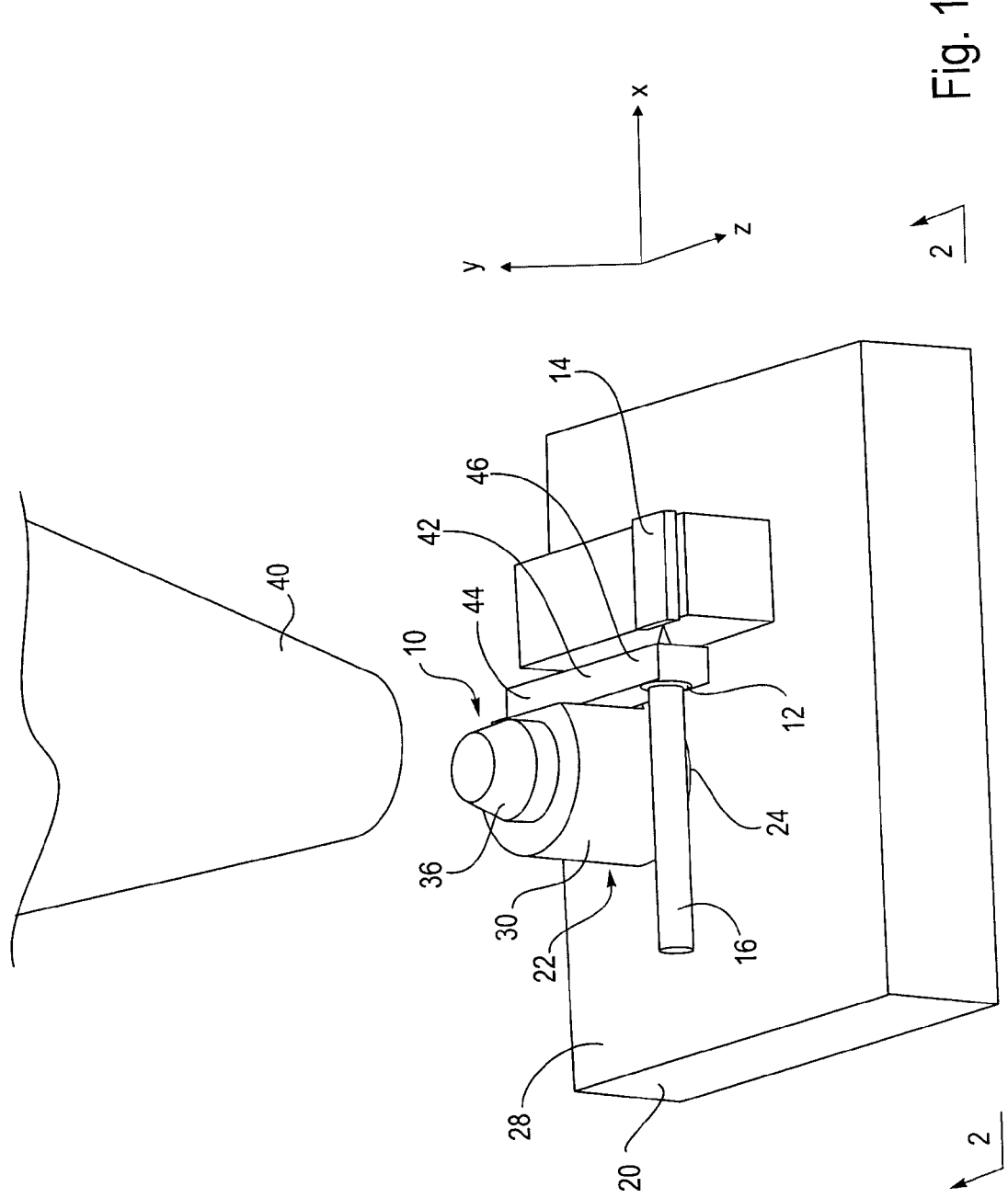
FIG. 1 is a perspective view of a microassembly according to one embodiment of the present invention.
Figure 2:
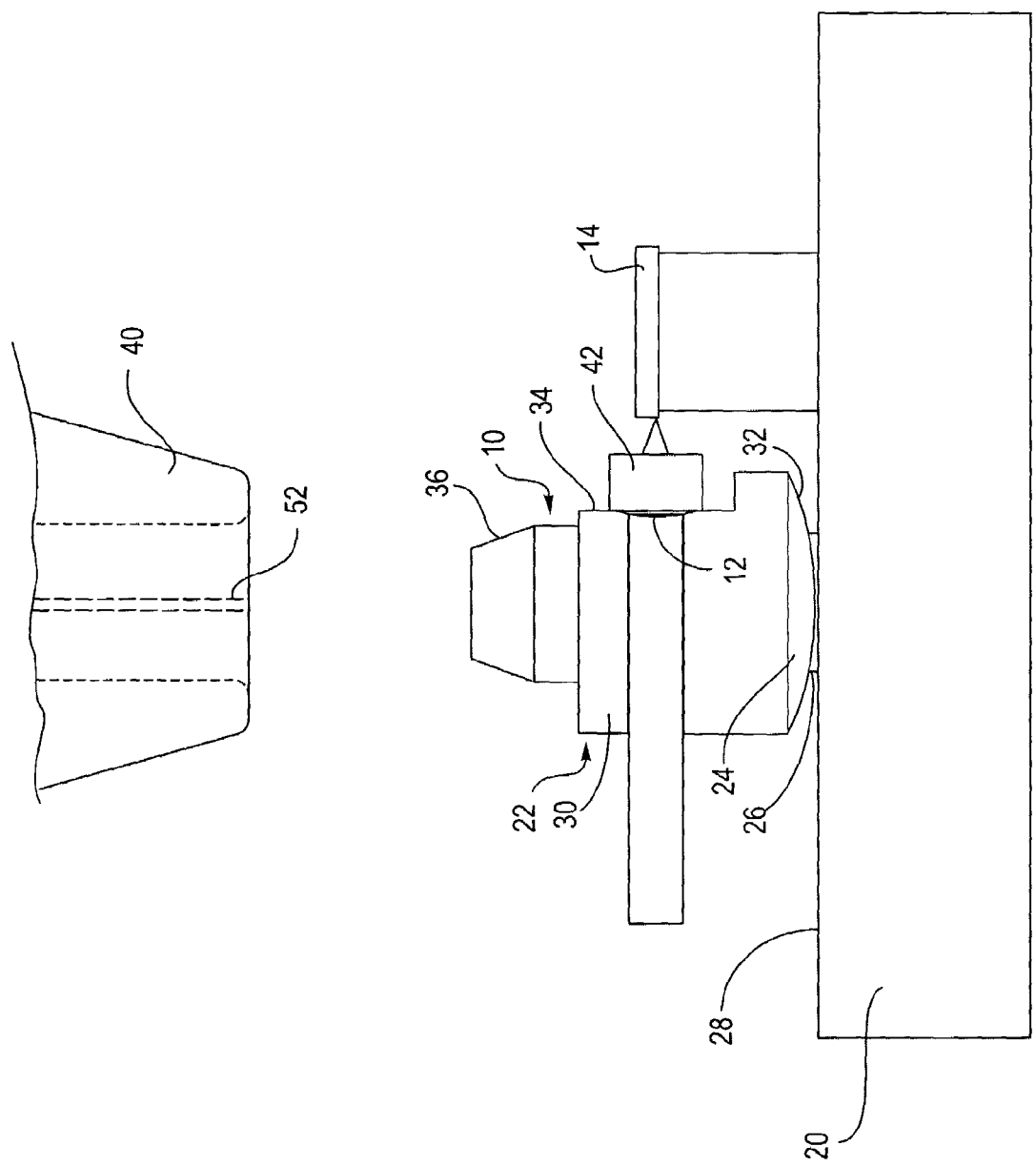
FIG. 2 is a side elevational view of the microassembly of FIG. 1 taken along the line 2—2 of FIG. 1.

In one embodiment of the invention, as shown in FIGS. 1 and 2, the microassembly 10 includes a support structure 20, a body 22 having a bulbous or rounded portion 24 in close proximity to the support structure 20 and the microelement 12 carried by the body 22. The rounded portion 24 of the body 22 is initially translatable relative to the support structure 20, that is in a plane parallel to the plane of the planar surface 28, and rotatable relative to the support structure 20 about three orthogonal axes (x,y,z) for permitting the microelement 12 to be desirably positioned relative to the support structure 20. A fastener 26 is employed to secure the rounded portion 24 to the support structure 20 after the microelement 12 is so desirably positioned.

Support structure 20 is preferably made from mechanically robust and chemically and thermally stable material such as silicon, metal oxides, nitrides or carbides. Support structure 20 preferably includes a substrate 20 having a planar surface 28 suitable for rotation and/or translation of the rounded portion 24 of the body 22 thereon as described below.

Body 22 has a bulbous or rounded portion 24 and a coupling or shaft portion 30. The rounded portion 24 preferably has a convexly curved surface 32 in at least two orthogonal directions. In a preferred embodiment, the rounded portion 24 is a segment of a sphere, although the rounded portion can have parabolic or other curved configurations and/or have an outer surface that is formed from a multitude of planar or other segments which together resemble a curved surface. The rounded portion 24 is in close proximity to the planar surface 28 of the support structure 20. The term "close proximity" as used herein means the rounded portion 24 is either in direct contact with the planar surface 28 or spaced from the planar surface 28 not more than approximately five microns. The combination of the convexly curved surface 32 of the rounded portion 24 and the close proximity of the rounded portion to the planar surface 28 of the support structure 20 provides the body 22 with the freedom of rotation and translation for positioning the microelement 12 rigidly attached to the body 22.

The coupling or shaft portion 30 of the body 22 can be spherically or cylindrically shaped. In a preferred embodiment, the shaft portion 30 is integral with the rounded portion 24. For example, the integral shaft and rounded portions 24 and 30 may have a shape of a sphere or top. The shaft portion 30 preferably has a cut out region providing a planar surface 34 for facilitating the mounting of microelement 12. The coupling or shaft portion 30 may include an interface portion 36 for facilitating the coupling of body 22 with tooling 40 such as a vacuum tool and translation stage (not shown) for rotating and translating body 22. Preferably, body 22 is made from a hard material such as sapphire.

Microelement 12 can be mounted directly on the planar surface 34 in the cut out region. For example, a translationally invariant element such as a diffraction grating can be rigidly attached to the planar surface 34 in the cut out region by any suitable means such as adhesive or solder bonding. Preferably, a rotationally invariant element such as a lens is mounted on an elongated member 42 which is rigidly attached to the planar surface 34 to permit more freedom of translation for the lens as described below. The elongated member 42 has first and second extremities 44 and 46 and extends along the z axis, perpendicular to the y axis or the central axis, of body 22. The first extremity 44 is rigidly attached to the planar surface 34 in the cut out region by any suitable means such as adhesive and soldering bonding. The microelement 12 is carried by the second extremity 46, preferably being formed in the second extremity 46 so as to be rotated and translated with body 22.

Figure 3:
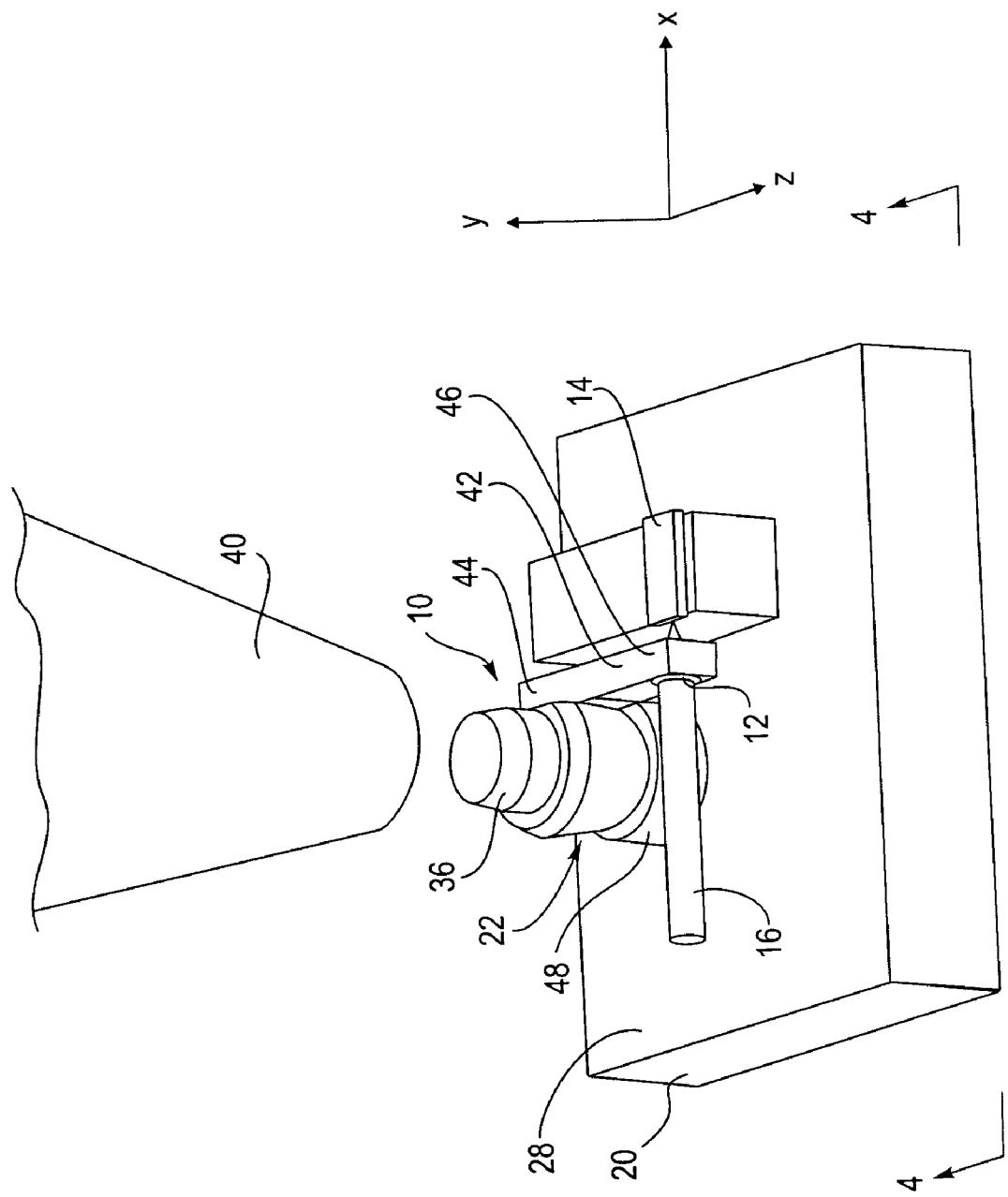
FIG. 3 is a perspective view of a microassembly according to another embodiment of present invention.

In another embodiment shown in FIGS. 3 and 4, the support structure 20 may include a tubular member 48 engaging the substrate for receiving the rounded portion 24 of body 22. The tubular member 48 is movable or translatable on the planar surface 28 of the substrate 20, such as along the x and z axes of direction. The rounded portion 24 of body 22 is movably rested on the inner circumstance 50 of the tubular member 48 in close proximity to the planar surface 28 of the substrate 20. Preferably the tubular member 48 is made from a material softer than that of body 22. For instance, if body 22 is made from sapphire, the tubular member 48 can be made from stainless steel. Preferably the inner circumstance 50 of the tubular member 48 is beveled at the point of contact with the rounded portion 24 of the body 22 so that the rounded portion 24 tends to center on the tubular member 48 as a downward force is applied. The shape of the bevel can be varied to optimize the centering tendency of the tubular member 48.

Fasteners 26 are used to secure body 22 to substrate 20 after the microelement 12 is desirably positioned as shown in FIGS. 1 to 4. For example, a bonding agent such as a adhesive material and solder can be introduced in, around or between the rounded portion 24 of body 22 and planar surface 28 of substrate 20 to secure body 22 on the substrate 20. In the embodiment shown in FIGS. 3 and 4, a solid epoxy preform can be placed inside the tubular member 48 and cured once the microelement 12 is desirably positioned. Preferably, the epoxy can slide along with the tubular member 48 during the positioning process of rotation and translation until it is cured in the cure process, allowing it to wet the rounded and substrate surfaces 32 and 28. Preferably the material for the tubular member 48 is not wetted by the epoxy so that bonding is limited to between body 22 and substrate 20. The cure process can be carried out optically or thermally. For example, an optical fiber 52 can be disposed in tooling 40 to carry out the cure process by means of local laser heating. Optical radiation can be transmitted through sapphire body 22 to heat the adhesive below the body. This can minimize the thermal distortions associated with the curing process. A solder perform can also be used in the cure process. For example, a solder preform can be applied to the convexly curved surface 32 of the rounded portion 24 and laser heated to produce a bond. Other alternative attachment techniques involving a low viscosity adhesive that wicks into the body-tubular member assembly from outside can also be used. The thickness of the fastener is preferably controlled so as to be not more than approximately ten microns.

In operation and use, body 22 with microelement 12 rigidly coupled thereto is gripped by a vacuum tool 40 through interface portion 36, and can be readily moved in free space using a convention optical stage (not shown). The vacuum tool 40 is mounted to a goniometer (not shown) with its center of rotation coincident with the center of body 22, which is in turn mounted to an x-y-z translation stage (not shown).

Body 22 with microelement 12 rigidly attached thereto is brought in close proximity to the planar surface 28 of substrate 20. Translation of body 22 in a direction on the planar surface 28 of substrate 20, such as in the x and/or z axes, translate the microelement 12 along such direction. In the embodiment where the microelement 12 is a rotationally invariant element such as a lens, a combination of rotation about the x axis and translation along the z axis of direction of body 22 translates the microelement 12 along the y direction. Because the lens 12 is radially symmetric, a combination of rotation θ about the x axis and translation Δ along the z axis direction so as to adjust the height of the lens 12 relative to the planar surface 28 of the substrate 20 does not change the optical property of the lens. Consequently by a series of rotation about the x axis and translation along the z axis of the body 22, lens 12 is adjusted to a desired height relative to the planar surface 28 of substrate 20.

Rotation of body 22 about the y and z axes of direction rotates the microelement 12 about the y and z axes of direction, and permits bringing the microelement 12 to a desired angular orientation. In the embodiment shown in FIGS. 1 to 4, rotation about z axis of direction brings the axis of the lens 12 parallel to the planar surface 28 of substrate 20 and the plane of the lens perpendicular to surface 28. Rotation about the y axis brings the axis of lens 12 parallel to the axis of a laser diode or amplifier 14. The lack of control in rotation about the x axis is permissible in this case because the lens 12 is invariant with respect to the rotation about the x axis.

Translationally invariant elements such as diffraction gratings can be similarly adjusted to a desired position through a series of translations and rotations of body 22. In this case, two rotations are needed to place the face of the grating in the desired plane, and a third angle is needed to place the lines of the grating perpendicular to the substrate. Adjustment in the x–z plane is then used to position the grating before the body is attached to the substrate. The lack of control in translation along the y axis is permissible in this case because the grating is invariant with respect to motion in the y axis. Other optical elements such as curved or flat mirrors, apertures or optical fibers can also be attached to body 22.

For any microelement 12, series of translation and rotation of body 22 brings the microelement 12 in a desired position shown in FIGS. 1 to 4. At the desired position of the microelement 12, the rounded portion 24 of the body 22 can be either in direct contact with the planar surface 28 of the substrate 20 or spaced above the planar surface 28 a distance ranging from 1 to 25 microns, preferably 1 to 10 microns, and more preferably not more than five microns. In both cases, body 22 is secured to the planar surface 28 by any suitable means as described above to fix the microelement 12 at the desired position.

The microassembly of the present invention is advantageous over prior art mounting and aligning devices. The microassembly uses simplified and inexpensive parts including rotatable body having rounded portion and movable tubular member and tooling to provide multi-degree of freedom motion for a microelement before being desirably positioned, thus eliminating the need for complicated fabrication of the holder and iterative procedure for deforming flexural elements as in the prior art.

The microassembly is also advantageous in that it allows a part adjusted in free space to be brought into mechanical contact with a substrate prior to bonding. Such an arrangement allows bonding with thin layers of adhesives configured to minimize any positional changes associated with curing or aging of the adhesive. Shrinkage and warping of thicker prior art adhesive layers shift the optics positions and ruin the alignments.

According to the present invention, the thickness of the fastener is controlled to not more than ten microns to avoid any shrinkage and warping which may result in shifting of the desired position of the microelement. Since the rounded portion of the body is in direct contact with or closely spaced to the planar surface of the substrate, a fastener having a thickness of not more than ten microns is sufficiently to rigidly attach the body to the substrate and at the same time avoid intolerable shifting of the desired position of the microelement caused by shrinkage and warping of the fasteners.

The foregoing description of specific embodiments and examples of the invention have been presented for the purpose of illustration and description, and although the invention has been illustrated by certain of the preceding examples, it is not to be construed as being limited thereby. It is intended that the scope of the invention encompass the generic area as herein disclosed, and by the claims appended hereto and their equivalents.

What is claimed is:

1. A microassembly comprising a support structure, a body having a single rounded portion in close proximity to the support structure for supporting the body with respect to the support structure, a microelement carried by the body and a fastener for securing the rounded portion to the support structure, the rounded portion being translatable relative to the support structure and being rotatable relative to the support structure about an axis before being secured to the support structure for permitting the microelement to be desirably positioned relative to the support structure.

2. The microassembly of claim 1 wherein the rounded portion has a convex curved surface in two orthogonal directions.

3. The microassembly of claim 2 wherein the rounded portion has the shape of a segment of a sphere.

4. The microassembly of claim 1 wherein the rounded portion engages the support structure.

5. The microassembly of claim 1 wherein the rounded portion is spaced not more than five microns from the support structure.

6. The microassembly of claim 1 wherein the fastener is a bonding agent.

7. The microassembly of claim 1 wherein the support structure includes a substrate and a tubular member engaging the substrate for receiving the rounded portion of the body, the tubular member being movable on the substrate before the rounded portion is secured to the support structure.

8. The microassembly of claim 1 wherein the body includes an elongate portion having first and second extremities, the first extremity being rigidly coupled to the rounded portion for permitting the second extremity to rotate with the rounded portion, the microelement being carried by the second extremity of the elongate portion.

9. The microassembly of claim 1 wherein the microelement is an optical element.

10. The microassembly of claim 9 wherein the optical element is a diffraction grating.

11. The microassembly of claim 9 wherein the optical element is a lens.

12. A method for positioning a microelement carried at an extremity of an elongate member attached to a body rotatable about first, second and third orthogonal axes relative to a support structure comprising the steps of translating the body relative to the support structure along the first axis to translate the microelement along the first axis, translating the body relative to the support structure along the second axis to translate the microelement along the second axis, rotating the body about the first axis and translating the body along the second axis relative to the support structure to translate the microelement along the third axis and securing the body to the support structure to fix the microelement relative to the support structure.

13. The method of claim 12 wherein the body includes a portion having the shape of a segment of a sphere.

14. The method of claim 13 wherein the support structure includes a substrate and a tubular member engaging the substrate for receiving the portion of the body, wherein the translating steps include the steps of translating the tubular member along the respective first and second axes.

15. The method of claim 12 wherein the microelement is an optical element.

16. The method of claim 12 wherein the securing step includes the step of bonding the body to the support structure.

17. A microassembly comprising a body having a rounded portion, a support structure including a substrate and a tubular member engaging the substrate for receiving the rounded portion of the body, a microelement carried by the body and a fastener for securing the rounded portion to the support structure, the tubular member being movable on the substrate and the rounded portion being rotatable relative to the support structure before the rounded portion is secured to the support structure for permitting the microelement to be desirably positioned relative to the support structure.

18. The microassembly of claim 17 wherein the rounded portion has a convex curved surface in two orthogonal directions.

19. The microassembly of claim 18 wherein the rounded portion has the shape of a segment of a sphere.

20. The microassembly of claim 17 wherein the fastener is a bonding agent.

21. The microassembly of claim 17 wherein the microelement is an optical element.

22. A microassembly comprising a support structure, a body having a rounded portion in close proximity to the support structure and an elongate portion having first and second extremities, the first extremity being rigidly coupled to the rounded portion, a microelement carried by the second extremity of the elongate portion and a fastener for securing the rounded portion to the support structure, the rounded portion being translatable relative to the support structure and rotatable relative to the support structure about an axis and the second extremity being rotatable with the rounded portion before the rounded portion is secured to the support structure for permitting the microelement to be desirably positioned relative to the support structure.

23. The microassembly of claim 22 wherein the rounded portion has a convex curved surface in two orthogonal directions.

24. The microassembly of claim 23 wherein the rounded portion has the shape of a segment of a sphere.

25. The microassembly of claim 22 wherein the fastener is a bonding agent.

26. The microassembly of claim 22 wherein the microelement is an optical element.

* * * * *